United States Patent
Chen et al.

(10) Patent No.: US 8,107,443 B2
(45) Date of Patent: Jan. 31, 2012

(54) METHOD OF PERFORMING CELL SEARCH FOR A WIRELESS COMMUNICATIONS SYSTEM

(75) Inventors: Chao-Yu Chen, Hsinchu (TW);
Chao-Ming Chang, TaiChung (TW);
Kuang-Jen Wang, Taipei (TW);
Mao-Ching Chiu, Chiayi County (TW)

(73) Assignee: Mediatek Inc., Hsin-Chu (TW)

( * ) Notice: Subject to any disclaimer, the term of this patent is extended or adjusted under 35 U.S.C. 154(b) by 542 days.

(21) Appl. No.: 12/368,988

(22) Filed: Feb. 10, 2009

(65) Prior Publication Data

US 2010/0203885 A1 Aug. 12, 2010

(51) Int. Cl.
*H04B 7/216* (2006.01)

(52) U.S. Cl. ........ 370/335; 370/203; 370/209; 370/342; 370/344; 455/550.1; 455/561; 375/345; 375/350; 375/365

(58) Field of Classification Search .................. 370/335, 370/342, 343, 344, 350, 203, 209, 211; 455/550.1, 455/561

See application file for complete search history.

(56) References Cited

U.S. PATENT DOCUMENTS

| | | | | |
|---|---|---|---|---|
| 5,931,893 A * | 8/1999 | Dent et al. | ..................... | 708/422 |
| 6,005,887 A * | 12/1999 | Bottomley et al. | ........... | 375/147 |
| 6,304,624 B1 * | 10/2001 | Seki et al. | ...................... | 375/365 |
| 6,366,938 B1 * | 4/2002 | Levison et al. | ............... | 708/422 |
| 6,381,229 B1 * | 4/2002 | Narvinger et al. | ........... | 370/328 |
| 6,480,558 B1 * | 11/2002 | Ottosson et al. | ............... | 375/350 |
| 6,724,743 B1 * | 4/2004 | Pigeonnat | ..................... | 370/335 |
| 6,731,673 B1 * | 5/2004 | Kotov et al. | .................. | 375/145 |
| 6,760,361 B2 * | 7/2004 | Nystrom et al. | ............. | 375/145 |
| 6,922,388 B1 * | 7/2005 | Laroia et al. | ..................... | 370/208 |
| 7,062,002 B1 * | 6/2006 | Michel et al. | ................. | 375/354 |
| 7,158,505 B2 * | 1/2007 | Dick et al. | ..................... | 370/350 |
| 7,672,405 B2 * | 3/2010 | Lin et al. | ....................... | 375/345 |

OTHER PUBLICATIONS

Cha'O-Ming Chang, "Optimum Timing Estimation without Channel Information over Frequency-Selective Slowly Fading Channels," IEEE Wireless Personal Multimedia Communications Conference, Nov. 2002, pp. 1337-1341.
Yossi Segal et al., "Preambles design for OFDMA PHY layer, FFT sizes of 1024,512 and 128," IEEE C802.16e-04/125, Jun. 27, 2004.

* cited by examiner

*Primary Examiner* — Nick Corsaro
*Assistant Examiner* — Babar Sarwar
(74) *Attorney, Agent, or Firm* — Winston Hsu; Scott Margo

(57) ABSTRACT

Performing cell search in a wireless communications system includes receiving a preamble signal, match filtering the preamble signal with a pseudo noise sequence to form a filtered preamble signal of a plurality of filtered preamble signals, choosing a largest filtered preamble signal from the plurality of filtered preamble signals, and determining an estimated pseudo noise sequence index and an estimated integer part frequency offset according to the largest filtered preamble signal.

11 Claims, 11 Drawing Sheets

| Signal Bandwidth | 3.5/7 MHz | 8.75 MHz | 5/10 MHz |
|---|---|---|---|
| $\delta f$ | 7.8125 KHz | 9.7656 KHz | 10.9375 KHz |
| $f_{int}$ (10 ppm) | 5 | 4 | 4 |
| $f_{int}$ (12 ppm) | 6 | 5 | 5 |
| $f_{int}$ (14 ppm) | 7 | 6 | 4 |
| $f_{int}$ (22 ppm) | 11 | 9 | 8 |

FIG. 1

METHOD OF PERFORMING CELL SEARCH FOR A WIRELESS COMMUNICATIONS SYSTEM

BACKGROUND OF THE INVENTION

1. Field of the Invention

The present invention relates to cell search for mobile wireless systems, and more particularly, to a method of performing cell search and integer part frequency offset estimation for a wireless communications system.

2. Description of the Prior Art

Orthogonal frequency division multiple access (OFDMA) has become one of the most promising technologies in modern wireless communications systems, owing to its robustness against frequency-selective channels, its flexibility for multi-rate transmission considering multiple users, and so on. It is also adopted as one of the air interfaces in IEEE 802.16, known as WirelessMAN-OFDMA.

WirelessMAN-OFDMA is a connection-oriented network, in which each frame has a preamble, a downlink subframe, and an uplink subframe, for time division duplex (TDD) mode operation. The preamble is an OFDM symbol with a cyclic prefix (CP) extension like other OFDM symbols within the frame. The difference between the preamble and normal OFDM symbols is that the preamble is binary-phase shift keying (BPSK) modulated by 114 possible pseudo-noise (PN) sequences transmitted by base stations (BSs). Mobile stations (MSs) detect the transmitted PN sequence among the 114 possibilities, so that the basic information of the BS, such as its segment index and cell number, may be acquired to perform demodulation of the downlink subframes. The procedure used to detect the PN sequence is called "cell search."

Although the selected set of PN sequences is characterized by low cross correlation, presence of cross correlation values can not be ignored when detecting the employed PN sequence, and therefore the computation power required to perform cell search is high. In addition, when considering the presence of integer part frequency offset, the uncertainty increases, such that the computation burden becomes even heavier.

SUMMARY OF THE INVENTION

According to a first embodiment of the present invention, a method of performing cell search in a wireless communications system includes receiving a preamble signal, match filtering the preamble signal with a first pseudo noise sequence to form a first filtered preamble signal, match filtering the preamble signal with a second pseudo noise sequence to form a second filtered preamble signal, modifying the second filtered preamble signal to form a modified filtered preamble signal, summing at least the first filtered preamble signal with the modified filtered preamble signal to form one of a plurality of summed preamble signals, choosing a largest summed preamble signal from the plurality of summed preamble signals, determining an estimated pseudo noise sequence index and an estimated integer part frequency offset according to the largest summed preamble signal, matching filtering the preamble signal with at least a first pseudo noise sequence and a second pseudo noise sequence corresponding to the estimated pseudo noise sequence index and the estimated integer part frequency offset to form a plurality of filtered preamble signals, and generating an estimated pseudo noise sequence from a largest filtered preamble signal of the plurality of filtered preamble signals. Optimum solution for integer part frequency offset and pseudo noise sequence index based on maximum a posteriori probability is:

$$(\hat{f}_i, \hat{P}) = \underset{f_i, P^{(i)}}{\arg\max} \sum_{l=0}^{L-1} \frac{\left|\sum_{n=0}^{N-1} r^*[n]\hat{s}_{l,f_i}[n]\right|^2}{\hat{C}_l^2 + \frac{\sigma^2}{\sigma_l^2}},$$

where:

$$s_{l,f_i}[n] \equiv \frac{1}{N}\sum_{k=0}^{N-1} \left(P^{(i)}[k]e^{-j\frac{2\pi kl}{N}}\right)e^{j\frac{2\pi(k+f_i)n}{N}},$$

$$\begin{cases} \hat{s}_{0,f_i}[n] \equiv s_{0,f_i}[n] & l = 0 \\ \hat{s}_{l,f_i}[n] \equiv s_{l,f_i}[n] - \sum_{a=0}^{l-1} \hat{s}_{a,f_i}[n]\frac{\eta(l,\alpha)}{\hat{C}_\alpha^2 + \frac{\sigma^2}{\sigma_\alpha^2}} & l \neq 0, \end{cases}$$

$$\eta(\alpha, \beta) \equiv \sum_{n=0}^{N-1} s_{\alpha,f_i}[n]\hat{s}^*_{\beta,f_i}[n],$$

$$C_0^2 \equiv E\{|P[k]|^2\} = \sigma_s^2, \text{ and}$$

$$\begin{cases} \hat{C}_0^2 \equiv C_0^2 & l = 0 \\ \hat{C}_l^2 \equiv C_0^2 - \sum_{a=0}^{l-1} \frac{|\eta(l,\alpha)|^2}{\hat{C}_\alpha^2 + \frac{\sigma^2}{\sigma_\alpha^2}} & l \neq 0. \end{cases}$$

According to a second embodiment of the present invention, a method of performing cell search in a wireless communications system comprises receiving a preamble signal, match filtering the preamble signal with a pseudo noise sequence to form a filtered preamble signal of a plurality of filtered preamble signals, choosing a largest filtered preamble signal from the plurality of filtered preamble signals, and determining an estimated pseudo noise sequence index and an estimated integer part frequency offset according to the largest filtered preamble signal. Optimum solution for integer part frequency offset and pseudo noise sequence index based on maximum a posteriori probability is:

$$(\hat{f}_i, \hat{P}) = \underset{f_i, P^{(i)}}{\arg\max} \sum_{l=0}^{L-1} \frac{\left|\sum_{n=0}^{N-1} r^*[n]\hat{s}_{l,f_i}[n]\right|^2}{\hat{C}_l^2 + \frac{\sigma^2}{\sigma_l^2}},$$

where:

$$s_{l,f_i}[n] \equiv \frac{1}{N}\sum_{k=0}^{N-1} \left(P^{(i)}[k]e^{-j\frac{2\pi kl}{N}}\right)e^{j\frac{2\pi(k+f_i)n}{N}},$$

$$\begin{cases} \hat{s}_{0,f_i}[n] \equiv s_{0,f_i}[n] & l = 0 \\ \hat{s}_{l,f_i}[n] \equiv s_{l,f_i}[n] - \sum_{a=0}^{l-1} \hat{s}_{a,f_i}[n]\frac{\eta(l,\alpha)}{\hat{C}_\alpha^2 + \frac{\sigma^2}{\sigma_\alpha^2}} & l \neq 0, \end{cases}$$

$$\eta(\alpha, \beta) \equiv \sum_{n=0}^{N-1} s_{\alpha,f_i}[n]\hat{s}^*_{\beta,f_i}[n],$$

$$C_0^2 \equiv E\{|P[k]|^2\} = \sigma_s^2, \text{ and}$$

-continued $$\begin{cases} \hat{C}_0^2 \equiv C_0^2 & l = 0 \\ \hat{C}_l^2 \equiv C_0^2 - \sum_{\alpha=0}^{l-1} \frac{|\eta(l,\alpha)|^2}{\hat{C}_\alpha^2 + \frac{\sigma^2}{\sigma_\alpha^2}} & l \neq 0. \end{cases}$$

According to a third embodiment of the present invention, a method of performing cell search in a wireless communications system comprises receiving a preamble signal, match filtering the preamble signal with a plurality pseudo noise sequences to form a plurality of filtered preamble signals, summing the plurality of filtered preamble signals to form one of a plurality of summed preamble signals, choosing a largest summed preamble signal from the plurality of summed preamble signals, determining an estimated pseudo noise sequence index and an estimated integer part frequency offset according to the largest summed preamble signal, matching filtering the preamble signal with at least a first pseudo noise sequence and a second pseudo noise sequence corresponding to the estimated pseudo noise sequence index and the estimated integer part frequency offset to form a plurality of filtered preamble signals, and generating an estimated pseudo noise sequence from a largest filtered preamble signal of the plurality of filtered preamble signals. Optimum solution for integer part frequency offset and pseudo noise sequence index based on maximum a posteriori probability is:

$$(\hat{f}_i, \hat{P}) = \arg\max_{f_i, P^{(i)}} \sum_{l=0}^{L-1} \frac{\left|\sum_{n=0}^{N-1} r^*[n]\hat{s}_{l,f_i}[n]\right|^2}{\hat{C}_l^2 + \frac{\sigma^2}{\sigma_l^2}},$$

where:

$$s_{l,f_i}[n] \equiv \frac{1}{N}\sum_{k=0}^{N-1} \left(P^{(i)}[k]e^{-j\frac{2\pi kl}{N}}\right)e^{j\frac{2\pi(k+f_i)n}{N}},$$

$$\begin{cases} \hat{s}_{0,f_i}[n] \equiv s_{0,f_i}[n] & l = 0 \\ \hat{s}_{l,f_i}[n] \equiv s_{l,f_i}[n] - \sum_{\alpha=0}^{l-1} \hat{s}_{\alpha,f_i}[n]\frac{\eta(l,\alpha)}{\hat{C}_\alpha^2 + \frac{\sigma^2}{\sigma_\alpha^2}} & l \neq 0, \end{cases}$$

$$\eta(\alpha,\beta) \equiv \sum_{n=0}^{N-1} s_{\alpha,f_i}[n]\hat{s}^*_{\beta,f_i}[n],$$

$$C_0^2 \equiv E\{|P[k]|^2\} = \sigma_s^2, \text{ and}$$

$$\begin{cases} \hat{C}_0^2 \equiv C_0^2 & l = 0 \\ \hat{C}_l^2 \equiv C_0^2 - \sum_{\alpha=0}^{l-1} \frac{|\eta(l,\alpha)|^2}{\hat{C}_\alpha^2 + \frac{\sigma^2}{\sigma_\alpha^2}} & l \neq 0. \end{cases}$$

According to a fourth embodiment of the present invention, a method for generating an integer part frequency offset set comprises generating a first sum of magnitudes of sub-carriers whose index is a multiple of 3 of the preamble signal, generating a second sum of magnitudes of sub-carriers whose index is a multiple of 3n+1 of the preamble signal, generating a third sum of magnitudes of sub-carriers whose index is a multiple of 3n+2 of the preamble signal, determining a greatest sum of the first, second and third sums, and determining the integer part frequency offset set corresponding to the greatest sum. A range of n is approximately one-third number of sub-carriers of the preamble signal.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 1 is a table of integer part frequency offsets for different ratios and signal bandwidth.

DETAILED DESCRIPTION

Figure 2:
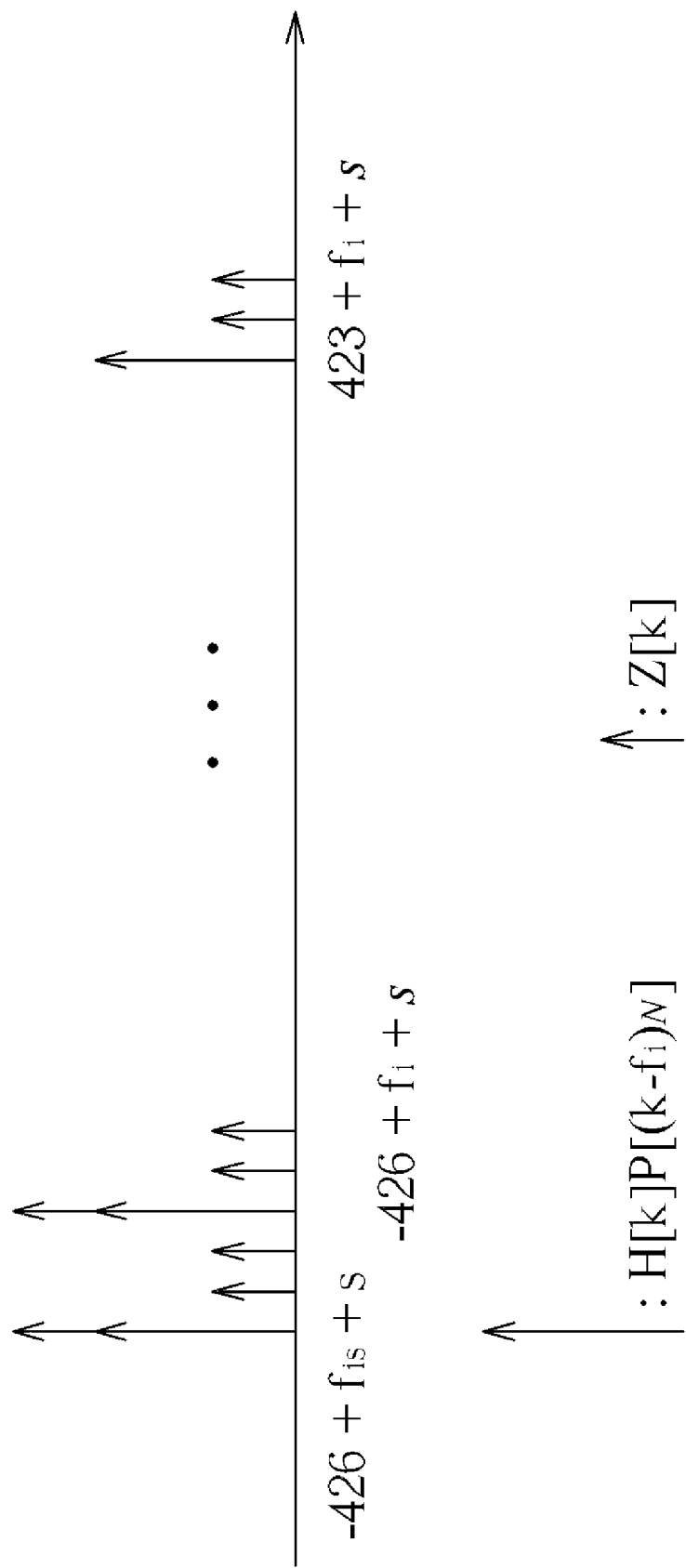
FIG. 2 is a frequency-domain diagram of a received OFDM signal of a preamble.

A cell search algorithm with ±20 ppm frequency offset of MSs in WirelessMAN-OFDMA of IEEE 802.16 may be considered in one embodiment. A cell search block is activated by a fractional-part frequency offset estimation, and therefore it is assumed that the fractional-part frequency offset is negligible. However, integer part frequency offset uncertainty is large (±9 sub-carriers at 3.8 GHz band over 10 MHz signal bandwidth considering ±2 ppm frequency offset at BS (c.f. Clause 8.4.14.1 [1])). The cell search algorithm may cover a range of frequency offsets from ±0 ppm to hundreds of ppm.

According to data sheets provided by RF vendors, a ratio of the frequency offsets of MSs may be less than ±20 ppm. The corresponding integer part frequency offsets can be found with respect to different ratios of frequency offsets and signal bandwidth (shown in FIG. 1), where the maximum possible integer part frequency offset is denoted by fint sub-carriers.

It is also assumed that coarse frame/symbol synchronization is provided by preamble detection and/or a delayed differential correlator, such that the received timing is coarsely known. Because the preamble symbols are currently not accumulated over frames, only the frequency-selective slowly fading channel is considered in the sequel.

Letting s(t) be the baseband transmitted signal of a preamble, $$s(t) = \frac{1}{N}\sum_{k=0}^{N-1} P[k]e^{j\frac{2\pi Wkt}{N}}, \quad (1)$$

where $P[k] \in \{0, \pm 1\}$ is the symbol value at sub-carrier k for k=0, 1, ..., N−1; N is the FFT size of the considered system;

and W is the null-to-null bandwidth of the transmitted signal. Letting $f_i \in Z$ be the integer part frequency offset, the received low-pass equivalent signal rLP(t) over the frequency-selective slowly fading channel is $$r_{LP}(t) = \sum_{l=0}^{L-1} \rho_l s\left(t - \frac{l}{W}\right) e^{j2\pi f_i \frac{W}{N} t} + z_{LP}(t) \quad (2)$$

where $\rho_0, \rho_1, \ldots, \rho_{L-1}$ are independent zero-mean complex-valued Gaussian random variables with variance $\sigma_0^2$, $\sigma_1^2, \ldots, \sigma_{L-1}^2$, respectively. By sampling $r_{LP}(t)$ at a rate W.

$$r[n] \equiv r_{LP}\left(\frac{n}{W}\right) = \frac{1}{N}\sum_{l=0}^{L-1}\rho_l \sum_{k=0}^{N-1} P[k] e^{j\frac{2\pi k(n-l)}{N}} e^{j\frac{2\pi f_i n}{N}} + z[n] \quad (3)$$

for $n = 0, 1, \ldots, N-1$.

Assuming that the integer part frequency offset and the employed PN sequence are independent and uniformly distributed, a maximum a posteriori probability (MAP) detection rule is $$(\hat{f}_i, \hat{P}) = \underset{f_i, P^{(i)}}{\arg\max}\, Pr(r[n]; n = 0, 1, \ldots, N-1 \mid P^{(i)}, f_i),$$

where $P^{(i)} = (P^{(i)}[0], P^{(i)}[1], \ldots, P^{(i)}[N-1])$ is an ith PN sequence and $$Pr(r[n]; n = 0, n = 1, \ldots, N-1 \mid P^{(i)}, f_i) =$$
$$\int\int \cdots \int Pr(r[n]; n = 0, 1, \ldots, N-1 \mid P^{(i)}, f_i, \rho_0, \rho_1, \ldots, \rho_{L-1}) \times$$
$$Pr(\rho_0, \rho_1, \ldots, \rho_{L-1}) d\rho_0 d\rho_1 \ldots d\rho_{L-1}.$$

Then, $$(\hat{f}_i, \hat{P}) = \underset{f_i, P^{(i)}}{\arg\max} \sum_{l=0}^{L-1} \frac{\left|\sum_{n=0}^{N-1} r^*[n]\hat{s}_{l,f_i}[n]\right|^2}{\hat{C}_l^2 + \frac{\sigma^2}{\sigma_l^2}}$$

where $$s_{l,f_i}[n] \equiv \frac{1}{N}\sum_{k=0}^{N-1}\left(P^{(i)}[k]e^{-j\frac{2\pi k l}{N}}\right)e^{j\frac{2\pi(k+f_i)n}{N}},$$

$$\begin{cases} \hat{s}_{0,f_i}[n] \equiv s_{0,f_i}[n] & l = 0 \\ \hat{s}_{l,f_i}[n] \equiv s_{l,f_i}[n] - \sum_{\alpha=0}^{l-1}\hat{s}_{\alpha,f_i}[n]\frac{\eta(l,\alpha)}{\hat{C}_\alpha^2 + \frac{\sigma^2}{\sigma_\alpha^2}} & l \neq 0, \end{cases}$$

$$\eta(\alpha, \beta) \equiv \sum_{n=0}^{N-1} s_{\alpha,f_i}[n]\hat{s}^*_{\beta,f_i}[n],$$

$$C_0^2 \equiv E\{|P[k]|^2\} = \sigma_s^2,$$

$$\begin{cases} \hat{C}_0^2 \equiv C_0^2 & l = 0 \\ \hat{C}_l^2 \equiv C_0^2 - \sum_{\alpha=0}^{l-1}\frac{|\eta(l,\alpha)|^2}{\hat{C}_\alpha^2 + \frac{\sigma^2}{\sigma_\alpha^2}} & l \neq 0. \end{cases}$$

The superscript * stands for the conjugation operation. By ignoring the small value on the auto-correlation function $\eta(\alpha, \beta)$ when $\alpha \neq \beta$ and $$|\alpha - \beta| \ll \frac{N}{3},$$

the suboptimal but simplified form becomes $$(\hat{f}_i, \hat{P}) = \underset{f_i, P^{(i)}}{\arg\max} \sum_{l=0}^{L-1} \frac{\left|\sum_{n=0}^{N-1} r^*[n]s_{l,f_i}[n]\right|^2}{\sigma_s^2 + \frac{\sigma^2}{\sigma_l^2}}. \quad (4)$$

According to Parseval's formula, $$\left|\sum_{n=0}^{N-1} r^*[n] s_{l,f_i}[n]\right|^2 = \left|\frac{1}{N}\sum_{k=0}^{N-1} R^*[k] S_{l,f_i}[k]\right|^2,$$

where $$R[k] \equiv \sum_{n=0}^{N-1} r[n] e^{-j\frac{2\pi kn}{N}} \text{ and } S_{l,f_i}[k] \equiv \sum_{n=0}^{N-1} s_{l,f_i}[n] e^{-j\frac{2\pi kn}{N}}$$

are the N-point FFTs of r[n] and s[n], respectively. Letting $$s[n] \equiv \frac{1}{N}\sum_{k=0}^{N-1} P^{(i)}[k] e^{j\frac{2\pi kn}{N}},$$

$$s_{l,f_i}[n] = s[(n-l)_N] e^{j\frac{2\pi f_i n}{N}}$$

and $$S_{l,f_i}[k] = P^{(i)}[(k-f_i)_N] e^{-j\frac{2\pi(k-f_i)l}{N}}.$$

Therefore, the suboptimal realization in (4) becomes $$(\hat{f}_i, \hat{P}) = \underset{f_i, P^{(i)}}{\arg\max}\, \mu(f_i, P^{(i)}) \quad (5)$$

where

-continued $$\mu(f_i, P^{(i)}) = \sum_{l=0}^{L-1} \frac{\left|\frac{1}{N}\sum_{k=0}^{N-1} R^*[k]S_{l,f_i}[k]\right|^2}{\sigma_s^2 + \frac{\sigma^2}{\sigma_l^2}}$$

$$= \sum_{l=0}^{L-1} \frac{\left|\frac{1}{N}\sum_{k=0}^{N-1} R^*[k]P^{(i)}[(k-f_i)_N]e^{-j\frac{2\pi(k-f_i)l}{N}}\right|^2}{\sigma_s^2 + \frac{\sigma^2}{\sigma_l^2}}$$

$$= \sum_{l=0}^{L-1} \frac{\left|\frac{1}{N}\sum_{k=0}^{N-1} R[k]P^{(i)}[(k-f_i)_N]e^{j2\pi kl/N}\right|^2}{\sigma_s^2 + \frac{\sigma^2}{\sigma_l^2}}$$

Defining $T^{(i)}[k] \equiv R[k]P^{(i)}[(k-f_i)_N]$, $$\mu(f_i, P^{(i)}) = \sum_{l=0}^{L-1} \left|\frac{1}{N}\sum_{k=0}^{N-1} T^{(i)}[k]e^{j2\pi kl/N}\right|^2 \cdot \xi_l, \quad (6)$$

where $\xi_l = \sigma_l^2/(\sigma_l^2\sigma_s^2 + \sigma^2)$.

As pointed out by Kuang-jen Wang and Mao-Ching Chiu, the term $$\frac{1}{N}\sum_{k=0}^{N-1} T^{(i)}[k]e^{j2\pi kl/N}$$

in (6) is actually the N-point IFFT of $T^{(i)}[k]$. Therefore, letting $$t^{(i)}[l] \equiv 1/N \cdot \sum_{k=0}^{N-1} T^{(i)}[k]e^{j2\pi kl/N},$$

$$\mu(f_i, P^{(i)}) = \sum_{l=0}^{L-1} |t^{(i)}[l]|^2 \cdot \xi_l. \quad (7)$$

In addition, please note that $P^{(i)}[(k-f_i)_N] \in \{0, \pm 1\}$ for $k \in \{0, 1, \ldots, N-1\}$, and hence calculation of $T^{(i)}[k]$ does not involve multiplication.

Computing the metric for each possible integer part frequency offset and each possible PN sequence, the number of IFFT operations required is $114 \times (2[\Delta f_{max}/df]+3)$, which is very large, e.g. $114 \times 21 = 2166$. It is, however, possible to reduce number of candidates of integer part frequency offsets and PN sequences.

To reduce the candidates of integer part frequency offsets, the received time-domain signal is considered:

$$r[n] = \frac{1}{N}\sum_{l=0}^{L-1} \rho_l \sum_{k=0}^{N-1} P[k]e^{j2\pi k(n-l)/N}e^{2\pi f_i n/N} + z[n]$$

$$= \frac{1}{N}\sum_{k=0}^{N-1}\left(\sum_{l=0}^{L-1}\rho_l P[k]e^{-j2\pi kl/N}\right)e^{2\pi(k+f_i)n/N} + z[n].$$

The received frequency-domain signal is then $$R[k] = \sum_{n=0}^{N-1} r[n]e^{-j2\pi nk/N}$$

$$= \frac{1}{N}\sum_{l=0}^{L-1}\rho_l \sum_{n=0}^{N-1}\sum_{k'=0}^{N-1} P[k']e^{j2\pi(k-k'+f_i)n/N}e^{-2\pi kl/N} + Z[k]$$

$$= \frac{1}{N}\sum_{l=0}^{L-1}\rho_l \sum_{k'=0}^{N-1} P[k']\left(\sum_{n=0}^{N-1} e^{j2\pi(k-k'+f_i)n/N}\right)e^{-2\pi kl/N} + Z[k]$$

$$= \sum_{l=0}^{L-1}\rho_l P[(k-f_i)_N]e^{-2\pi kl/N} + Z[k]$$

$$= H[k]P[(k-f_i)_N] + Z[k]$$

where $$Z(k) = \sum_{n=0}^{N-1} z[n]e^{-j2\pi nk/N}$$

and $$H(k) = \sum_{l=0}^{L-1}\rho_l e^{-j2\pi nl/N} = \sum_{n=0}^{N-1}\rho_n e^{-j2\pi nk/N}$$

since it is assumed that $\rho_n = 0$ for $n \geq L$.

For any PN sequence P, $P[k]=0$ for $k \neq -426+s \pmod 3 \equiv s \pmod 3$ where s is a segment index of P. So, $$R[k] = H[k]P[(k-f_i)_N] + Z[k]$$

$$= \begin{cases} H[k]P[(k-f_i)_N] + Z[k], & k \equiv f_i + s \pmod 3; \\ Z[k], & \text{otherwise.} \end{cases}$$

FIG. 2 shows the received frequency-domain signal. In FIG. 2, it can be seen that the received signal is composed of noise in a carrier k, where $k \neq f_i + s \pmod 3$. Hence, a scheme may be proposed to reduce the number of candidates of the integer part frequency offsets. First, $$\sum_{k \equiv seg \pmod 3} |R[k]|^2 \quad (8)$$

is computed for seg=0,1,2, and $$seg^* = \text{argmax}_{seg} \sum_{k \equiv seg \pmod 3} |R[k]|^2$$

is denoted. Then, only the integer part frequency offsets $f_i$ for which $$f_i + s \equiv seg^* \pmod 3$$

are considered. Let $f_d = f_i + s$. Since $f_i + s \in \{-f_{int}, -f_{int}+1, \ldots, f_{int}+1, f_{int}+2\}$, the number of candidates of $f_d$ handled is reduced to $[(2f_{int}+3)/3]$. Let $P^{(i)}$ be an ith PN sequence with segment index $s^{(i)}$. The metric in (5) may then be written as $$\mu(f_i, P^{(i)}) = \sum_{l=0}^{L-1} \frac{\left|\frac{1}{N}\sum_{k=0}^{N-1} R^*[k]P^{(i)}[(k-f_d+s^{(i)})_N]e^{j2\pi kl/N}\right|^2}{\sigma_s^2 + \frac{\sigma^2}{\sigma_l^2}} \quad (9)$$

$$= \sum_{l=0}^{L-1}\left|\frac{1}{N}\sum_{k=0}^{N-1}T^{(i)}[k]e^{j2\pi kl/N}\right|^2 \cdot \xi_l$$

$$= \sum_{l=0}^{L-1}|t^{(i)}[l]|^2 \cdot \xi_l$$

where $T^{(i)}[k]=R^*[k]P^{(i)}[(k-f_d+s^{(i)})_N]$ and $\xi_l=\sigma_l^2/(\sigma_l^2\sigma_s^2+\sigma^2)$. Now, this metric needs only be computed when $f_d\equiv seg^*$ (mod3). Thus, for a given $f_d$, the metric for one of the 114 PN sequences may computed by performing one IFFT operation.

Next, a method is provided for computing the metric for more than one PN sequence in only one IFFT operation. First, Np PN sequences are added directly. Let $$Q^{(i_g)}=P^{(i_gN_P)}+P^{(i_gN_P+1)}+\ldots+P^{(i_gN_P+N_P-1)} \quad (10)$$

and $$\Phi^{(i_g)}[k]=R[k]Q^{(i_g)}[(k-f_i)_N] \quad (11)$$

for $i_g=0,1,2,\ldots,\lfloor 114/N_P\rfloor-1$. Corresponding time domain signals can then be obtained as $$\phi^{(i_g)}[l] = 1/N \cdot \sum_{k=0}^{N-1}\Phi^{(i_g)}[k]e^{j2\pi kl/N}.$$

Next, the metric is computed as in (9), and $\hat{f}_d$ and $\hat{i}_g$ corresponding to the largest metric are chosen:

$$(\hat{f}_d, \hat{i}_g) = \underset{f_d,i_g}{\arg\max}\,\mu(f_d, i_g) = \sum_{l=0}^{L-1}|\phi^{(i_g)}[l]|^2 \cdot \xi_l.$$

Finally, the metric of the Np PN sequences are added in the combined sequence $Q^{(i_g)}$, respectively. Letting $$\hat{i}' = \underset{i}{\arg\max}\,\tilde{\mu}(P^{(i)}) \quad 50$$

where $$\tilde{\mu}(P^{(i)}) = \sum_{l=0}^{L-1}\left|\frac{1}{N}\sum_{k=0}^{N-1}R[k]P^{(i)}[(k-\hat{f}_d+s^{(i)})_N]e^{j2\pi kl/N}\right|^2 \xi_l,$$

the index of the estimated PN sequence is $\hat{i}_gN_P+\hat{i}'$. Following this process, the total number of IFFT operations to complete the cell search algorithm is $\lceil 114/N_P\rceil\cdot[(2f_{int}+3)/3]+N_P$. When $N_P$ becomes large, the total number of IFFT operations needed decreases but the performance is also degraded. Hence, $N_P$ should be decided based on a tradeoff between complexity and performance.

In addition, adding Np PN sequences directly as in (10) is not a good method for combining the PN sequences. The combination in (11) is thus modified to $$\Phi^{(i_g)}[k] = \sum_{q=0}^{N_P-1} R[(k-\Delta_f\cdot[q/2])_N] \quad (12)$$

$$P^{(i_gN_P+q)}[(k-f_d+s^{(i_gN_P+q)}-\Delta_f\cdot[q/2])_N]j^{(1-(-1)^q)/2}$$

where $\Delta_f$ is a carrier shift for combining the PN sequences. We also multiply the PN sequences with odd index with a factor j.

For example, the combination in (12) is illustrated for Np=4, and the value of $\Delta_f$ is decided. For Np=4, (12) can be expressed as $$\Phi^{(i_g)}[k] =$$
$$R[k]P^{(4i_g)}[(k-f_d+s^{(4i_g)})_N] + R[k]P^{(4i_g+1)}[(k-f_d+s^{(4i_g+1)})_N]j +$$
$$R[(k-\Delta_f)_N]P^{(4i_g+2)}[(k-f_d+s^{(4i_g+2)}-\Delta_f)_N] +$$
$$R[(k-\Delta_f)_N]P^{(4i_g+3)}[(k-f_d+s^{(4i_g+3)}-\Delta_f)_N]j$$

for $i_g=0,1,\ldots,28$. For simplicity, consider the metric for $i_g=0$:

$$\mu(f_d, 0) = \sum_{l=0}^{L-1}\left|\frac{1}{N}\sum_{k=0}^{N-1}\Phi^{(0)}[k]e^{j2\pi kl/N}\right|^2 \xi_l \quad (13)$$

$$= \sum_{l=0}^{L-1}\left|\frac{1}{N}\sum_{k=0}^{N-1}(R[k]P^{(0)}[(k-f_d+s^{(0)})_N]e^{j2\pi kl/N} + \right.$$
$$R[k]P^{(1)}[(k-f_d+s^{(1)})_N]e^{j2\pi kl/N+j\pi/2} +$$
$$R[k]P^{(2)}[(k-f_d+s^{(2)})_N]e^{j2\pi(k+\Delta_f)l/N} +$$
$$\left. R[k]P^{(3)}[(k-f_d+s^{(3)})_N]e^{j2\pi(k+\Delta_f)l/N+j\pi/2}\right|^2 \xi_l$$

$$= \sum_{l=0}^{L-1}\left(\left|\frac{1}{N}\sum_{k=0}^{N-1}R[k]P^{(0)}[(k-f_d+s^{(0)})_N]e^{j2\pi kl/N}\right|^2 + \right.$$
$$\left|\frac{1}{N}\sum_{k=0}^{N-1}R[k]P^{(1)}[(k-f_d+s^{(1)})_N]e^{j2\pi kl/N}\right|^2 +$$
$$\left|\frac{1}{N}\sum_{k=0}^{N-1}R[k]P^{(2)}[(k-f_d+s^{(2)})_N]e^{j2\pi kl/N}\right|^2 +$$
$$\left.\left|\frac{1}{N}\sum_{k=0}^{N-1}R[k]P^{(3)}[(k-f_d+s^{(3)})_N]e^{j2\pi kl/N}\right|^2\right)\xi_l +$$

$$\sum_{l=0}^{L-1}\frac{2}{N^2}\left(\sum_{p\neq q}Re\{A^{(p)}(A^{(q)})^*\}\right)\xi_l$$

$$= \sum_{l=0}^{L-1}(|t^{(0)}[l]|^2 + |t^{(1)}[l]|^2 + |t^{(2)}[l]|^2 + |t^{(3)}[l]|^2)\xi_l +$$

$$\sum_{l=0}^{L-1}\frac{2}{N^2}\left(\sum_{p\neq q}Re\{A^{(p)}(A^{(q)})^*\}\right)\xi_l$$

where $$A^{(p)} = \sum_{k=0}^{N-1}R[k]P^{(p)}[(k-f_d+s^{(p)})_N]e^{j2\pi(k+\Delta_f[p/2])l/N+j\pi(1-(-1)^p)/4}.$$

Consider the cross term $Re\{A^{(0)}(A^{(1)})^*\}$ first $$Re\{A^{(0)}(A^{(1)})^*\} = Re\left\{\sum_{k=0}^{N-1}\sum_{k'=0}^{N-1} R[k]P^{(0)}[(k-f_d+s^{(0)})_N]e^{j2\pi kl/N}R^*[k']\right.$$
$$\left. P^{(1)}[(k'-f_d+s^{(1)})_N]e^{-j2\pi k'l/N - j\pi/2}\right\} =$$

$$Re\left\{-j\sum_{k=0}^{N-1}\sum_{k'=0}^{N-1} R[k]R^*[k']P^{(0)}[(k-f_d+s^{(0)})_N]\right.$$
$$\left. P^{(1)}[(k'-f_d+s^{(1)})_N]e^{j2\pi(k-k')l/N}\right\}$$

When $k \ne k'$, $R[k]R^*[k']$ is small with respect to $R[k]R^*[k]=|R[k]|^2$. Therefore, the above equation can be approximated to be $$Re\{A^{(0)}(A^{(1)})^*\} \approx Re\left\{-j\sum_{k=0}^{N-1}|R[k]|^2 P^{(0)}[(k-f_d+s^{(0)})_N]\right. \quad (14)$$
$$\left. P^{(1)}[(k-f_d+s^{(1)})_N]\right\} = 0,$$

since $|R[k]|^2$, $P^{(0)}[(k-f_d+s^{(0)})_N]$, and $P^{(1)}[(k-f_d+s^{(1)})_N]$ are all real for all $k=0,1,\ldots,N-1$. Then, consider the cross term $$Re\{A^{(0)}(A^{(2)})^*\} = Re\left\{\sum_{k=0}^{N-1}\sum_{k'=0}^{N-1} R[k]P^{(0)}[(k-f_d+s^{(0)})_N]\right.$$
$$\left. e^{j2\pi kl/N}R^*[k']P^{(2)}[(k'-f_d+s^{(2)})_N]e^{-j2\pi(k'+\Delta_f)l/N}\right\} =$$

$$Re\left\{e^{-j2\pi\Delta_f l/N}\sum_{k=0}^{N-1}\sum_{k'=0}^{N-1} R[k]R^*[k']\right.$$
$$\left. P^{(0)}[(k-f_d+s^{(0)})_N]P^{(2)}[(k'-f_d+s^{(2)})_N]e^{j2\pi(k-k')l/N}\right\}.$$

Similar to (14), the approximated equation becomes $$\sum_{l=0}^{L-1} Re\{A^{(0)}(A^{(2)})^*\} \approx \quad (15)$$

$$\sum_{l=0}^{L-1} Re\left\{e^{-j2\pi\Delta_f l/N}\sum_{k=0}^{N-1}|R[k]|^2 P^{(0)}[(k-f_d+s^{(0)})_N]\right.$$
$$\left. P^{(2)}[(k-f_d+s^{(2)})_N]\right\} =$$

$$Re\left\{\sum_{l=0}^{L-1} e^{-j2\pi\Delta_f l/N} \cdot B\right\}$$

where $$B = \sum_{k=0}^{N-1} |R[k]|^2 P^{(0)}[(k-f_d+s^{(0)})_N]P^{(2)}[(k-f_d+s^{(2)})_N]$$

is not a function of l. Letting $\Delta_f=N/2$, (15) can be rewritten as $$\sum_{l=0}^{L-1} Re\{A^{(0)}(A^{(1)})^*\} = Re\left\{B \cdot \sum_{l=0}^{L-1} e^{-j\pi l}\right\} \quad (16)$$

$$= \begin{cases} 0, \text{ [Para 0100]} & \text{if } L \text{ is even,} \\ B, \text{ [Para 0101]} & \text{otherwise.} \end{cases}$$

Without loss of generality, it is assumed that the $0^{th}$ PN sequence $P^{(0)}$ is transmitted. Hence, from (14) and (16), (13) can be rewritten as $$\mu(f_d, 0) = \sum_{l=0}^{L-1} \left(|t^{(0)}[l]|^2 + |t^{(1)}[l]|^2 + |t^{(2)}[l]|^2 + |t^{(3)}[l]|^2\right)\xi_l +$$

$$\sum_{l=0}^{L-1} \frac{2}{N^2}\left(\sum_{p \ne q} Re\{A^{(p)}(A^{(q)})^*\}\right)\xi_l$$

$$\approx \sum_{l=0}^{L-1} |t^{(0)}[l]|^2 \xi_l + \sum_{l=0}^{L-1} \frac{2}{N^2}\left(\sum_{p \ne q} Re\{A^{(p)}(A^{(q)})^*\}\right)\xi_l$$

$$\approx \sum_{l=0}^{L-1} |t^{(0)}[l]|^2 \xi_l.$$

If the cross correlation of any two distinct PN sequences approximates zero, $\xi_l$ approximates a constant for all l, and L is even. From the above equation, it can be seen that the metric of the combined signal containing the transmitted PN sequence is close to the metric of the transmitted PN sequence.

In the above example, the case for $N_P=4$ is considered, and $\Delta_f$ is decided to be $N/2$ under the assumption that $\xi_l$ remains constant for different l. For any $N_P$, $\Delta_f$ may be chosen to be $$\Delta_f = \frac{N}{\left[\frac{N_P}{2}\right]}$$

which is not the best decision if $\xi_l$ is not a constant, but which is an appropriate option for any possible $\xi_l$'s.

In practice, statistics of channel impulse response (CIR) are unknown, so the metric should be simplified to be $$\mu(f_d, P^{(i)}) = \sum_{l=0}^{L-1} |t^{(i)}[l]|^2.$$

Performance decreases if this metric is used to estimate the integer part frequency offset and the employed PN sequence:

$$(\hat{f}_d, \hat{P}) = \arg\max_{f_d, P^{(i)}} \mu(f_d, P^{(i)}).$$

It is known that $\xi_l = \sigma_l^2/(\sigma_l^2\sigma_s^2+\sigma^2)=0$. So in (9), $|t^{(i)}[l]|^2$ is added in the metric computation only when $\sigma_l^2 \ne 0$. Hence, the metric may be modified as $$\mu(f_d, P^{(i)}) = \sum_{l \in L_{N_{path}}} |t^{(i)}[l]|^2,$$

where $L_{N_{peak}}=\{1:0\leq l\leq L-1, |t^{(i)}[l]|^2$ is one of the largest $N_{path}$ metric $|t^{(i)}[m]|^2$ for $m=0,1,\ldots,L-1\}$. Furthermore, $|\cdot|$ can be used to replace the operation $|\cdot|^2$ to avoid use of multiplication. Also, an operation $|\cdot|_a$ is used to approximate the operation $|\cdot|$, since $|a+jb|=\sqrt{a^2+b^2}\approx\max(a,b)+\min(a,b)/2=|a+jb|_a$. Hence, the metric finally employed may be $$\mu(f_d, P^{(i)}) = \sum_{l \in Lp} |t^{(i)}[l]|_a$$

$$= \sum_{l \in Lp} \max(\text{Re}\{t^{(i)}[l]\}, \text{Im}\{t^{(i)}[l]\}) + \frac{1}{2}\min(\text{Re}\{t^{(i)}[l]\}, \text{Im}\{t^{(i)}[l]\})$$

where $L_{N_{peak}}=\{1:0\leq l\leq L-1, |t^{(i)}[l]|_a$ is one of the largest $N_{path}$ metric $|t^{(i)}[m]|_a$ for $m=0,1,\ldots,L-1\}$. (8) can also be modified to $$\sum_{k=seg(mod3)} |R[k]|_a$$

for seg=0,1,2, with seg* denoted as $$seg^* = \text{argmax}_{seg} \sum_{k=seg(mod3)} |R[k]|_a.$$

Figure 3:
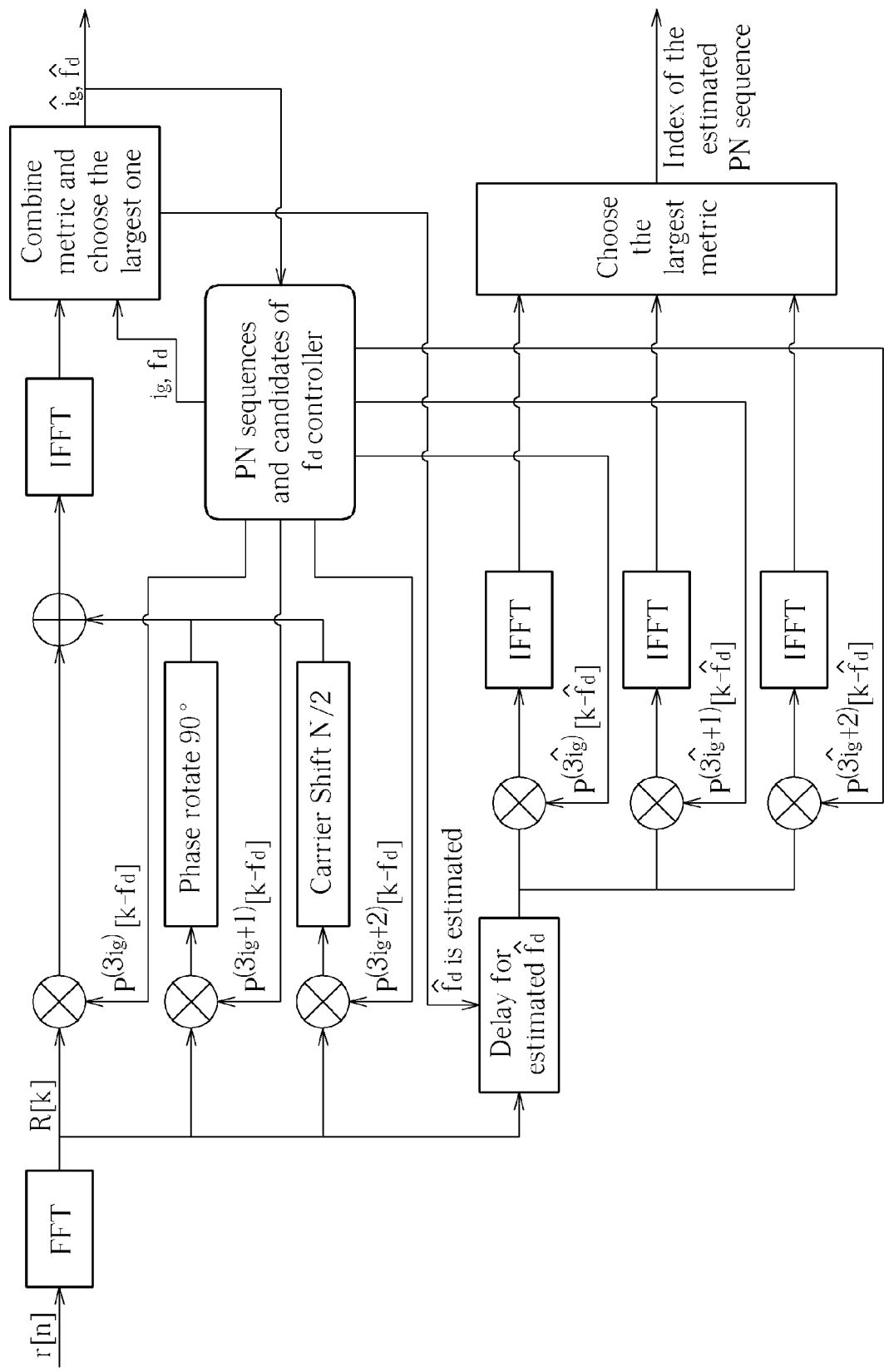
FIG. 3 is a block diagram of an embodiment of a cell search algorithm according to the present invention.
Figure 4:
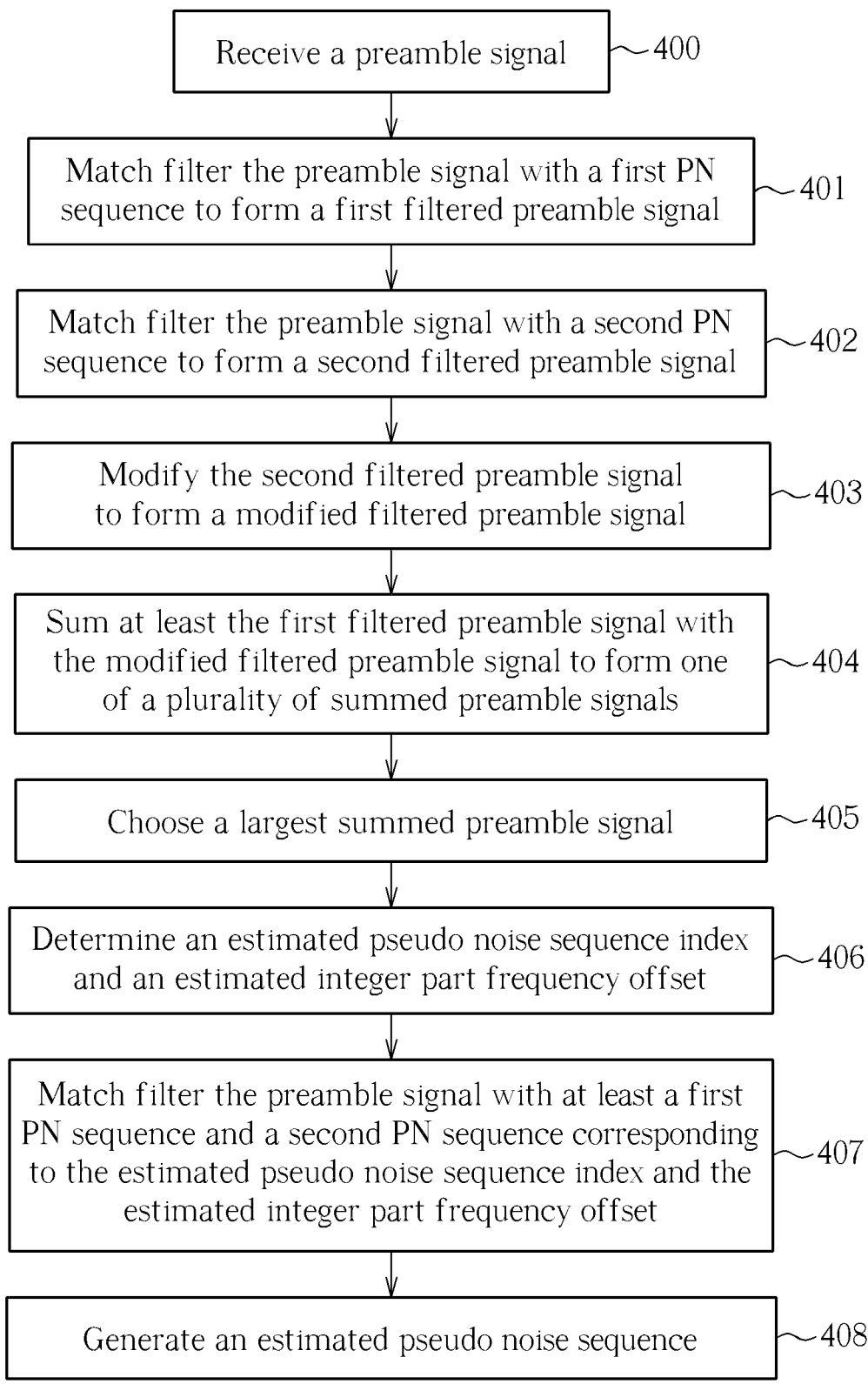
FIGS. 4-6 are flowcharts of embodiments of performing cell search in a wireless communications system by utilizing the cell search algorithm of FIG. 3.
Figure 5:
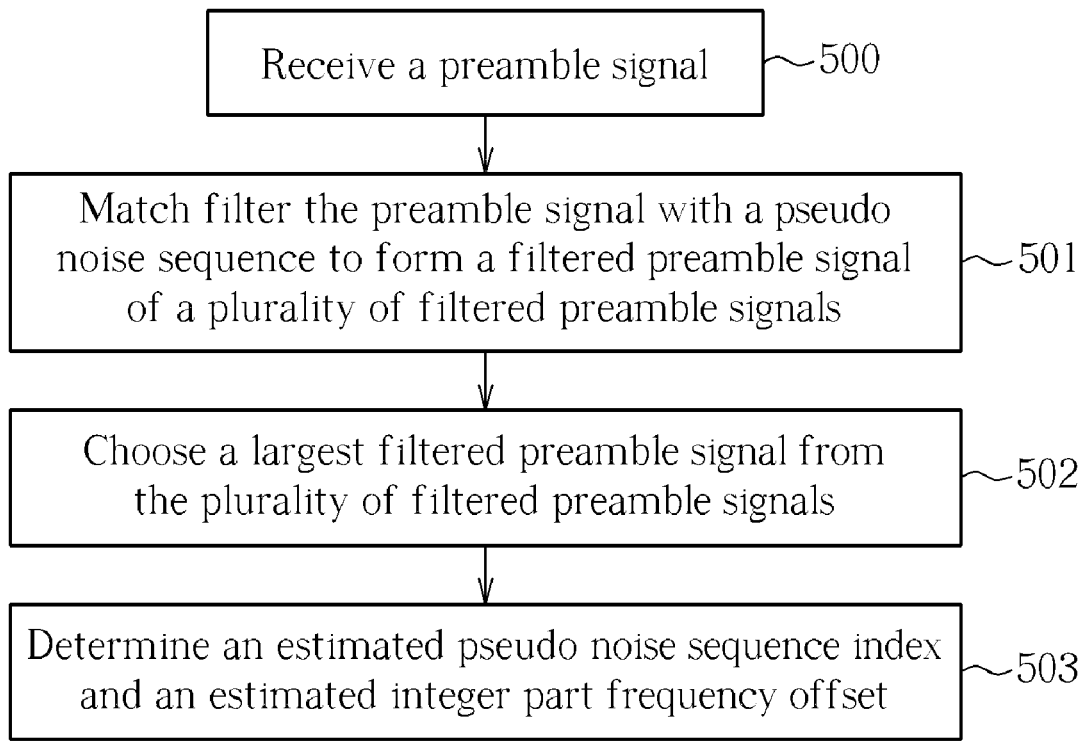
Figure 6:
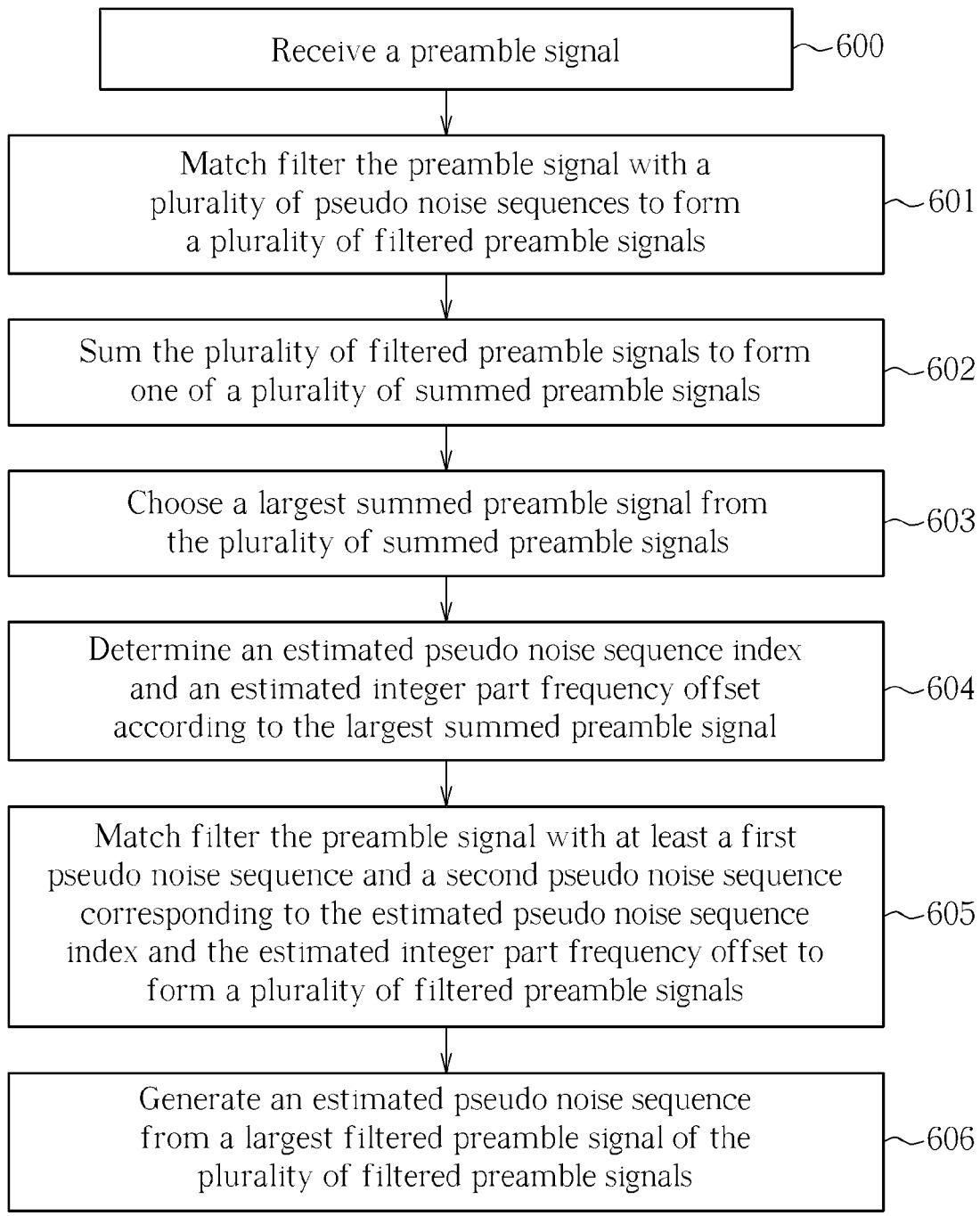
Figure 7:
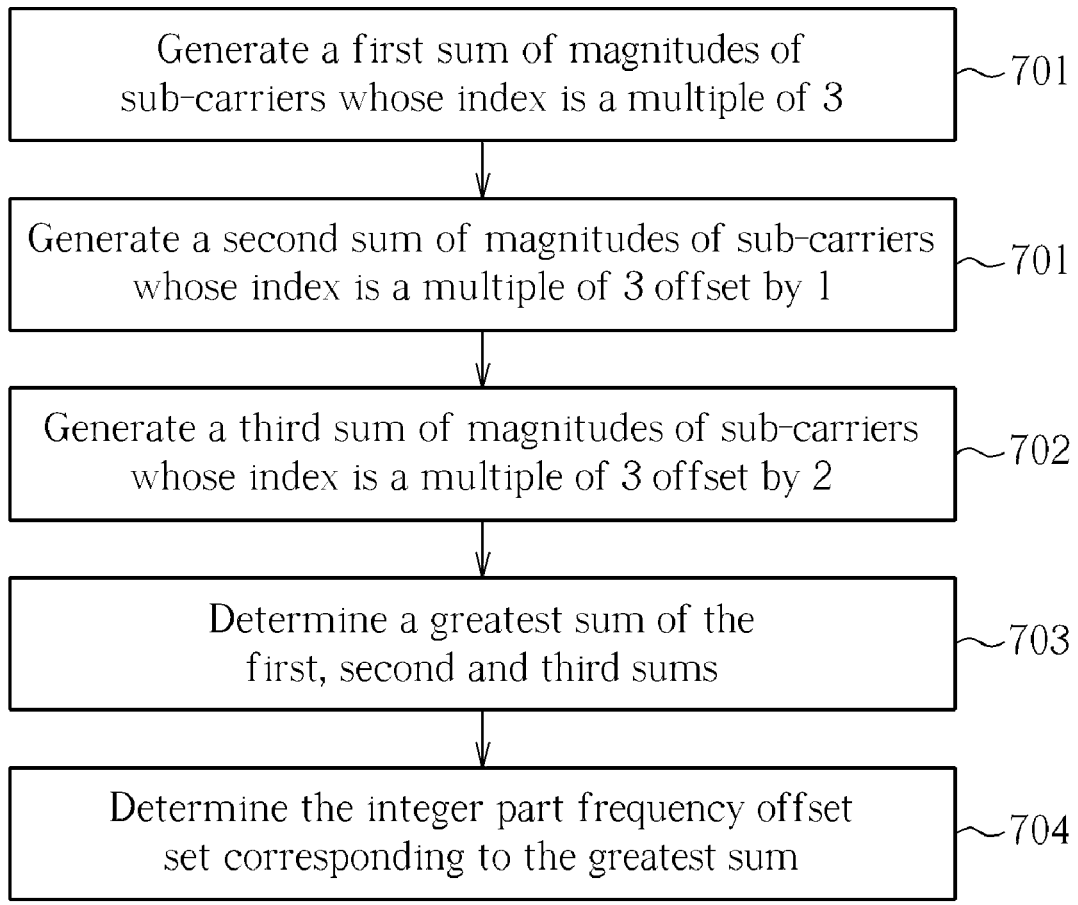
FIG. 7 is a flowchart of an embodiment for generating a set of integer part frequency offsets by utilizing the cell search algorithm of FIG. 3.

Please refer to FIGS. 3-7. FIG. 3 is a block diagram of an embodiment of the cell search algorithm for $N_P=3$. FIGS. 4-6 are flowcharts of embodiments of performing cell search in a wireless communications system by utilizing the cell search algorithm of FIG. 3, and FIG. 7 is a flowchart of an embodiment for generating a set of integer part frequency offsets by utilizing the cell search algorithm of FIG. 3. Referring first to FIG. 4, a method of performing cell search in a wireless communications system includes the following steps:

Step 400: Receive a preamble signal.
Step 401: Match filter the preamble signal with a first pseudo noise sequence to form a first filtered preamble signal.
Step 402: Match filter the preamble signal with a second pseudo noise sequence to form a second filtered preamble signal.
Step 403: Modify the second filtered preamble signal to form a modified filtered preamble signal.
Step 404: Sum at least the first filtered preamble signal with the modified filtered preamble signal to form one of a plurality of summed preamble signals.
Step 405: Choose a largest summed preamble signal from the plurality of summed preamble signals.
Step 406: Determine an estimated pseudo noise sequence index and an estimated integer part frequency offset according to the largest summed preamble signal.
Step 407: Match filter the delayed preamble signal with at least a first pseudo noise sequence and a second pseudo noise sequence corresponding to the estimated pseudo noise sequence index and the estimated integer part frequency offset to form a plurality of filtered preamble signals.
Step 408: Generate an estimated pseudo noise sequence from a largest filtered preamble signal of the plurality of filtered preamble signals.

Referring back to FIG. 3, a preamble signal r[n] is received (Step 400), then match filtered with a first PN sequence $P^{(3i_g)}[k-f_d]$ and a second PN sequence, e.g. a PN sequence $P^{(3i_g+1)}[k-f_d]$ or a PN sequence $P^{(3i_g+2)}[k-f_d]$, to form first and second filtered preamble signals, respectively (Steps 401-402). The second filtered preamble signal is modified, e.g. by performing phase rotation of 90° or by performing an N/2 carrier shift, to form a modified filtered preamble signal (Step 403). Then, at least the first filtered preamble signal and the modified filtered preamble signal are summed to form one of a plurality of summed preamble signals (Step 404). For example, Steps 401-404 may be repeated to cover all possible combinations of PN sequences and integer part frequency offsets, as described above, whereby the plurality of summed preamble signals may be formed. Out of the plurality of summed preamble signals, a largest summed preamble signal is selected (Step 405), and an estimated PN sequence index $\hat{i}_g$ and integer part frequency offset $\hat{f}_d$ are determined (Step 406) depending on which summed preamble signal of the plurality of summed preamble signals has the largest value. The estimated PN sequence index $\hat{i}_g$ may then correspond to a group of $N_P$ PN sequences. The FFT output data of the preamble R(k) for $k=0,1,\ldots,N-1$ is stored before acquiring the integer part frequency offset $\hat{f}_d$. After the integer part frequency offset $\hat{f}_d$ is estimated, the preamble signal is then match filtered with at least a first PN sequence $P^{(3\hat{i}_g)}[k-\hat{f}_d]$ and a second PN sequence $P^{(3\hat{i}_g+1)}[k-\hat{f}_d]$ corresponding to the estimated PN sequence index $\hat{i}_g$ and the estimated integer part frequency offset $\hat{f}_d$ to form a plurality of filtered preamble signals (Step 407). Depending on which of the plurality of filtered preamble signals is largest, an estimated PN sequence is generated (Step 408), thus completing the cell search operation.

Referring to FIG. 5, a method of performing cell search in a wireless communications system includes the following steps:

Step 500: Receive a preamble signal.
Step 501: Match filter the preamble signal with a pseudo noise sequence to form a filtered preamble signal of a plurality of filtered preamble signals.
Step 502: Choose a largest filtered preamble signal from the plurality of filtered preamble signals.
Step 503: Determine an estimated pseudo noise sequence index and an estimated integer part frequency offset according to the largest filtered preamble signal.

Similar to the method of FIG. 4, the preamble signal r[n] is received (Step 500). Then, the preamble signal r[n] is match filtered with a pseudo noise sequence, e.g. $P^{(3i_g)}[k-f_d]$ to form a filtered preamble signal of a plurality of filtered preamble signals (Step 501). For example, Step 501 may be repeated to cover all possible combinations of PN sequences and integer part frequency offsets, as described above, whereby the plurality of filtered preamble signals may be formed. Out of the plurality of filtered preamble signals, a largest filtered preamble signal is chosen (Step 502). Then, according to the largest filtered preamble signal, an estimated PN sequence index $\hat{i}_g$ and an estimated integer part frequency offset $\hat{f}_d$ are determined (Step 503).

Referring to FIG. 6, a method of performing cell search in a wireless communications system includes the following steps:

Step 600: Receive a preamble signal.
Step 601: Match filter the preamble signal with a plurality of pseudo noise sequences to form a plurality of filtered preamble signals.
Step 602: Sum the plurality of filtered preamble signals to form one of a plurality of summed preamble signals.
Step 603: Choose a largest summed preamble signal from the plurality of summed preamble signals.

Step 604: Determine an estimated pseudo noise sequence index and an estimated integer part frequency offset according to the largest summed preamble signal.

Step 605: Match filter the delayed preamble signal with at least a first pseudo noise sequence and a second pseudo noise sequence corresponding to the estimated pseudo noise sequence index and the estimated integer part frequency offset to form a plurality of filtered preamble signals.

Step 606: Generate an estimated pseudo noise sequence from a largest filtered preamble signal of the plurality of filtered preamble signals.

In the method shown in FIG. 6, after receiving the preamble signal (Step 600), the preamble signal is match filtered with a plurality of PN sequences, e.g. PN sequences $P^{(3i_g)}[k-f_1]$ $P^{(3i_g+1)}[k-f_d]$, and $P^{(3i_g+2)}[k-f_d]$, to form a plurality of filtered preamble signals (Step 601). The plurality of filtered preamble signals are summed to form one of a plurality of summed preamble signals (Step 602). Then, out of the plurality of summed preamble signals, a largest summed preamble signal is chosen (Step 603), and based on the largest summed preamble signal, an estimated PN sequence index $\hat{i}_g$ and an estimated integer part frequency offset $\hat{f}_d$ are determined (Step 604). At this point, because the estimated PN sequence index $\hat{i}_g$ may represent more than one filtered preamble signal, e.g. three filtered preamble signals, the delayed preamble signal is match filtered with at least a first PN sequence, e.g. $P^{(3\hat{i}_g)}[k-\hat{f}_d]$, and a second PN sequence, e.g. $P^{(3\hat{i}_g+1)}[k-\hat{f}_d]$, corresponding to the estimated PN sequence index $\hat{i}_g$ and the estimated integer part frequency offset $\hat{f}_d$ to form a plurality of filtered preamble signals (Step 605). Then, the estimated PN sequence is generated from a largest filtered preamble signal of the plurality of filtered preamble signals (Step 606).

FIG. 7 shows a method of reducing frequency-domain uncertainty for reducing number of times needed for searching for the transmitted PN sequence and the integer part frequency offset. To reduce frequency-domain uncertainty, the integer part frequency offset set may be found by generating three sums of sub-carriers of the received preamble signal. A first sum of magnitudes of sub-carriers whose index is a multiple of 3, e.g. sub-carriers 0, 3, 6, 9, and so on, is generated (Step 700). A second sum of sub-carriers whose index is a multiple of 3 offset by 1, e.g. sub-carriers 1, 4, 7, 10, and so on, is generated (Step 701). And, a third sum of sub-carriers whose index is a multiple of 3 offset by 2, e.g. sub-carriers 2, 5, 8, 11, and so on, is generated (Step 702). By determining a greatest sum out of the first sum, the second sum, and the third sum (Step 703), the integer part frequency offset set may be found corresponding to the greatest sum (Step 704). For example, if the integer part frequency offset is 8 sub-carriers, the preamble signal may only have values in sub-carriers 8, 11, 14, and so on, so the greatest sum will be the third sum. Thus, the number of integer part frequency offset candidates to be match filtered with the preamble signal may be reduced by ⅔. In the above, n has a range of approximately ⅓ the number of sub-carriers total in the preamble signal. The method of FIG. 7 may be incorporated into the methods of FIGS. 4, 5, and 6.

Figure 8:
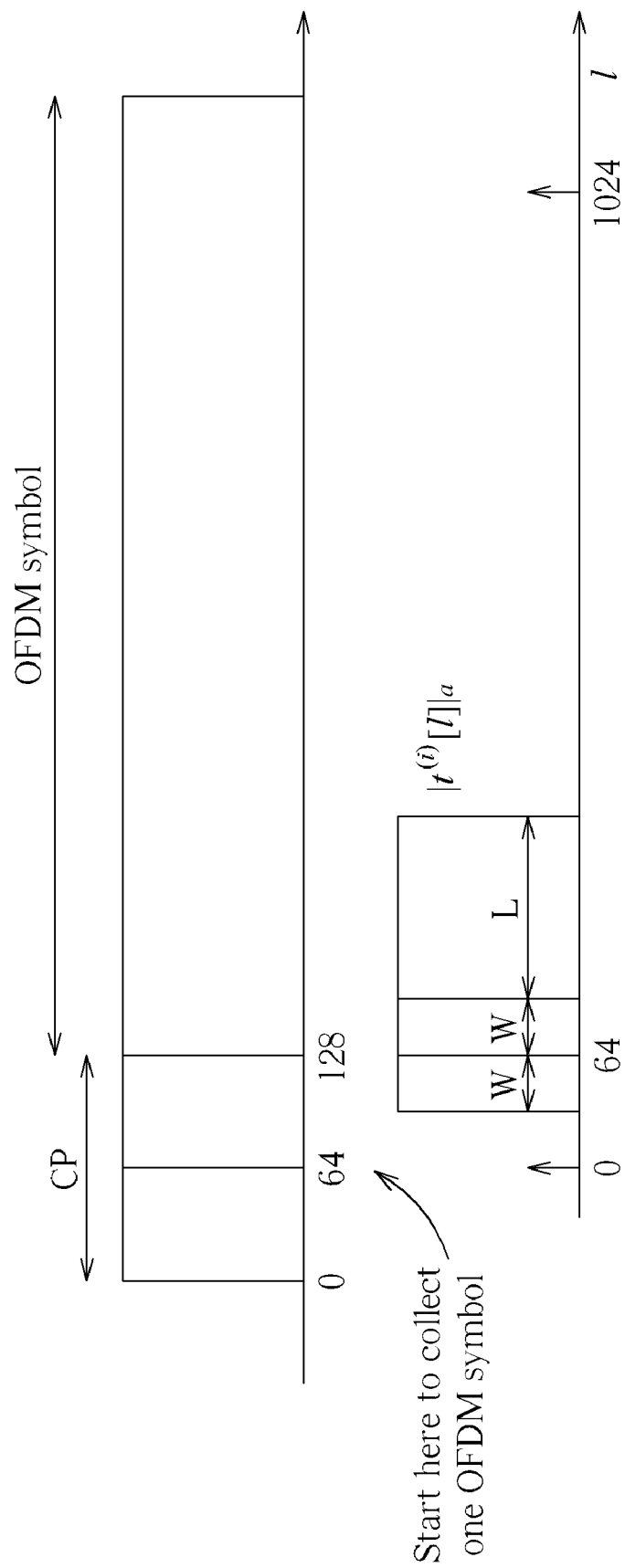
FIG. 8 is a diagram of a window for calculating the metric in the preamble where frame boundary is only coarsely estimated.

Please refer to FIG. 8, which is a diagram of a window for calculating the metric in the preamble where frame boundary is only coarsely estimated. FIG. 8 shows the preamble. Since there exists a timing error after coarse timing estimation, an OFDM signal at a position on the CP interval is collected to avoid inter-symbol interference (ISI) caused by the timing error. Lengths W and L of the window are due to timing uncertainty and delay spread, respectively. As shown in FIG. 8, $$\mu(f_d, P^{(i)}) = \sum_{l \in L_{N_{path}}} |t^{(i)}[l]|_a$$

where $L_{N_{peak}} = \{1:64-W \leq l \leq 64+W+L-1, |t^{(i)}[l]|_a$ is one of the largest $N_{path}$ metrics $|t^{(i)}[m]|_a$ for $m=64-W, 65-W, \ldots, 63+W+L\}$. Total window length is $2W+L$.

Figure 9:
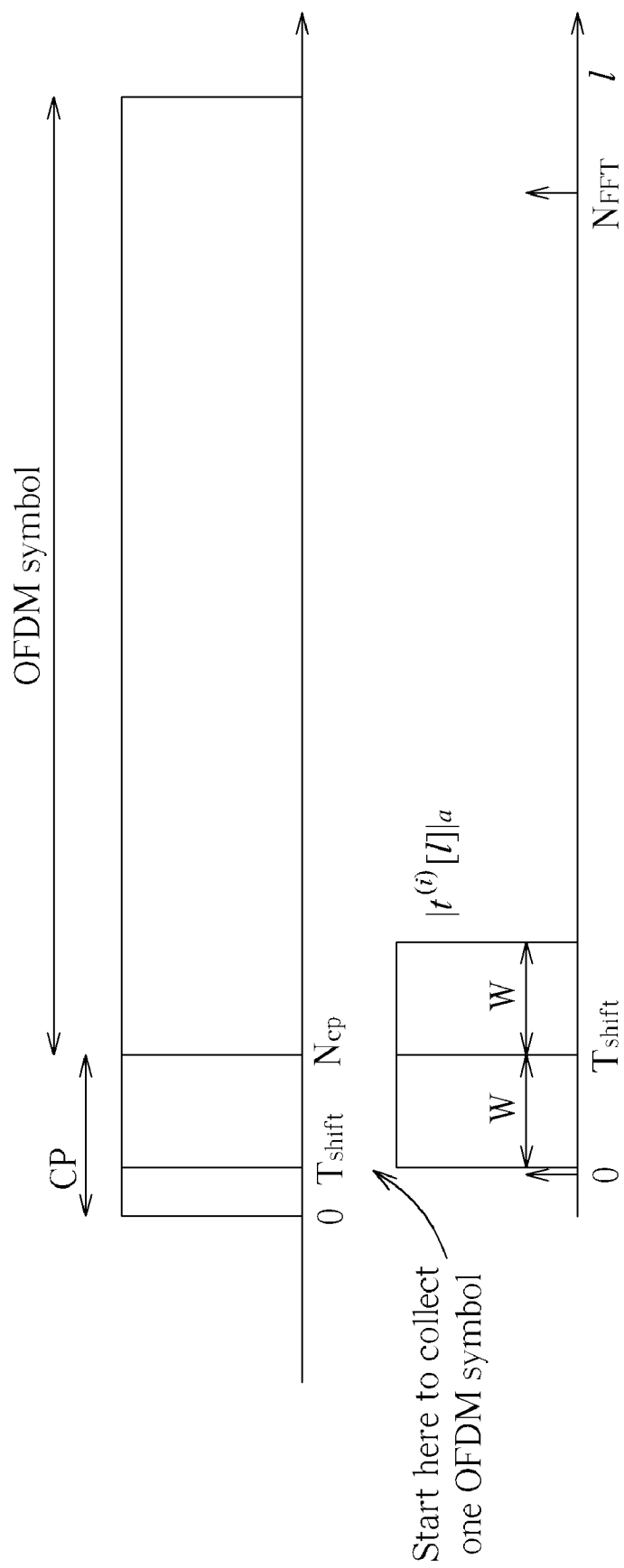
FIG. 9 is a diagram of another window for calculating the metric in the preamble.

Please refer to FIG. 9, which is a diagram of another window for calculating the metric in the preamble. In FIG. 8, only channels with moderate delay spread are considered. Sometimes, however, channels with large delay spread, e.g. SUI-5 channels, may be encountered. In this situation, the window length W should be modified to be large enough to cover range of multi-path delay spread. But, performance for the AWGN channel degrades due to the large window length W. Therefore, a method that is robust to both AWGN channels and fading channels with large delay spread is provided.

The window to choose the metric is modified to be $L_{N_{path}} = \{1: T_{shift}-W \leq l \leq T_{shift}+W+1, |t^{(i)}[l]|_a$ is one of the largest $N_{path}$ metrics $|t^{(i)}[m]|_a$ for $m=T_{shift}-W, T_{shift}-W+1, \ldots, T_{shift}+W\}$. And, the total window length is $2W+1$. Such modification is illustrated in FIG. 9.

Figure 10:
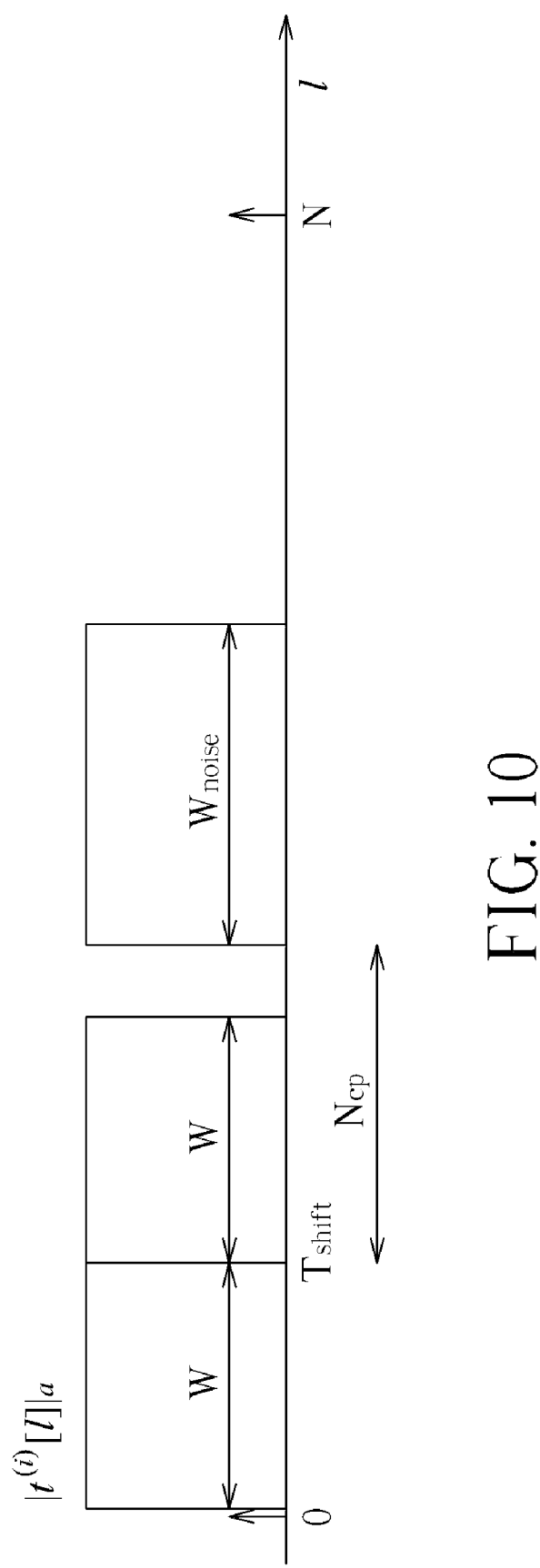
FIG. 10 is a diagram of a window for estimating the metric of a noise term.

Please refer to FIG. 10, which is a diagram of a window for estimating the metric of a noise term. As shown in FIG. 10, a window of length $W_{noise}$ is chosen for estimating the metric of the noise term. Not only the length, but also position, of the window should be chosen carefully for estimating the metric of the noise term. As shown in FIG. 10, the metric of the noise term is averaged from the position $T_{shift}+N_{CP}$ to $T_{shift}+N_{CP}+W_{noise}-1$. That is, the estimated metric of the noise term $\hat{\mu}_{noise}$ can be given as:

$$\hat{\mu}_{noise} = \frac{1}{W_{noise}} \sum_{t=T_{shift}+N_{CP}}^{T_{shift}+N_{CP}+W_{noise}-1} |t^{(i)}[l]|_a$$

Figure 11:
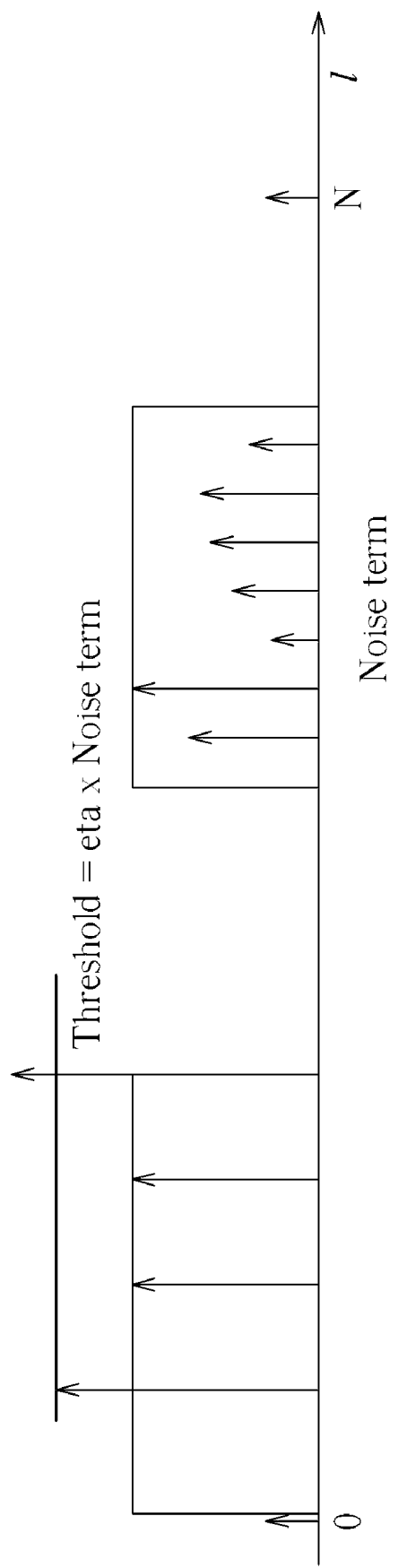
FIG. 11 is a diagram of a threshold for deciding number of combined multi-path metrics.

Then, a threshold $\mu_{thres} = \eta \cdot \hat{\mu}_{noise}$ is set. If the largest metric is larger than the threshold, then the metric $$\mu(f_d, P^{(i)}) = \sum_{l \in L_{N_{path}}} |t^{(i)}[l]|_a$$

is not changed. Otherwise, the metric $$\mu(f_d, P^{(i)}) = \sum_{l \in L_2} |t^{(i)}[l]|_a$$

where only the largest two metrics $|t^{(i)}[l]|_a$ are added may be used. This is shown in FIG. 11. For high SNR, $\hat{\mu}_{noise}$ is small, and so is $\mu_{thres}$. Hence, the number of metrics added in $\mu(f_d, P^{(i)})$ is usually $N_{path}$. For low SNR, the number is usually two. For the AWGN channel, the system usually operates at low SNR.

Therefore, in the above, when computing the metric of the combined signals, the following may be computed:

$$\mu(f_d, i_g) = \begin{cases} \sum_{l \in L_{N_{path}}} |\phi^{(i_g)}[l]|_a, & \text{if } \max_{l \in L_{N_{path}}} |\phi^{(i_g)}[l]|_a > \eta_1 \cdot \hat{\mu}_{noise} \\ \sum_{l \in L_2} |\phi^{(i_g)}[l]|_a, & \text{otherwise,} \end{cases}$$

where $f_d = \text{seg} * (\text{mod} 3)$ and for $i_g = 0, 1, \ldots, [114/N_P] - 1$.

Likewise, when computing the metric of the $N_P$ PN sequences $(P^{(i_g N_P)}, P^{(i_g N_P + 1)}, \ldots, P^{((i_g+1)N_P - 1)})$, the following may be computed:

$$\tilde{\mu}(P^{(i)}) = \begin{cases} \sum_{l \in L_{N_{path}}} |t^{(i)}[l]|_a, & \text{if } \max_{l \in L_{N_{path}}} |t^{(i)}[l]|_a > \eta_2 \cdot \hat{\mu}_{noise} \\ \sum_{l \in L_2} |t^{(i)}[l]|_a, & \text{otherwise} \end{cases}$$

for $i = \hat{i}_g N_P, \hat{i}_g N_P + 1, \ldots, \hat{i}_g N_P + N_P - 1$.

In conclusion, the cell search algorithm considering non-zero integer part frequency offset is described. A joint integer part frequency offset and transmitted PN sequence estimator are derived based on the maximum-likelihood (ML) criterion. This optimal realization requires the Gram-Schmidt procedure to mitigate interference introduced by the non-impulse-like auto-correlation of the PN sequences, whose complexity is high. Therefore, the suboptimum realization is derived to simplify the complexity. Core operation of the derived cell search may be implemented by an IFFT operation to reduce complexity. Methods for reducing the uncertainty of the integer part frequency offset and the PN sequences with small performance degradation are described, such that the fast cell search is realized at low cost.

Those skilled in the art will readily observe that numerous modifications and alterations of the device and method may be made while retaining the teachings of the invention.

What is claimed is:

1. A method of performing cell search in a wireless communications system, the method comprising:
   receiving a preamble signal;
   match filtering the preamble signal with a first pseudo noise sequence to form a first filtered preamble signal;
   match filtering the preamble signal with a second pseudo noise sequence to form a second filtered preamble signal;
   modifying the second filtered preamble signal to form a modified filtered preamble signal;
   summing at least the first filtered preamble signal with the modified filtered preamble signal to form one of a plurality of summed preamble signals;
   choosing a largest summed preamble signal from the plurality of summed preamble signals;
   determining an estimated pseudo noise sequence index and an estimated integer part frequency offset according to the largest summed preamble signal;
   match filtering the preamble signal with at least a first pseudo noise sequence and a second pseudo noise sequence corresponding to the estimated pseudo noise sequence index and the estimated integer part frequency offset to form a plurality of filtered preamble signals; and
   generating an estimated pseudo noise sequence from a largest filtered preamble signal of the plurality of filtered preamble signals.

2. The method of claim 1 further comprising:
   generating a first sum of magnitudes of sub-carriers whose index is a multiple of 3 of the preamble signal;
   generating a second sum of magnitudes of 3n+1 channels of the preamble signal;
   generating a third sum of magnitudes of 3n+2 channels of the preamble signal;
   determining a greatest sum of the first, second and third sums; and
   determining an integer part frequency offset set corresponding to the greatest sum;
   wherein a range of n is approximately one-third number of channels of the preamble signal; and
   wherein receiving the preamble signal is receiving a preamble signal offset by an integer part frequency offset of the integer part frequency offset set.

3. The method of claim 1 wherein modifying the second filtered preamble signal to form the modified filtered preamble signal is phase rotating the second filtered preamble signal to form the modified filtered preamble signal.

4. The method of claim 1 wherein modifying the second filtered preamble signal to form the modified filtered preamble signal is carrier shifting the second filtered preamble signal to form the modified filtered preamble signal.

5. The method of claim 1, further comprising:
   match filtering the preamble signal with the first pseudo noise sequence at a plurality of delay values to form a plurality of filtered preamble signals;
   wherein forming the first filtered preamble signal comprises combining the plurality of filtered preamble signals to form the first filtered preamble signal.

6. A method of performing cell search in a wireless communications system, the method comprising:
   receiving a preamble signal;
   match filtering the preamble signal with a pseudo noise sequence to form a filtered preamble signal of a plurality of filtered preamble signals, wherein match filtering the preamble signal with the pseudo noise sequence to form the filtered preamble signal of the plurality of filtered preamble signals comprises match filtering the preamble signal with the pseudo noise sequence at a plurality of delay values to form the plurality of filtered preamble signals;
   choosing a largest filtered preamble signal from the plurality of filtered preamble signals; and
   determining an estimated pseudo noise sequence index and an estimated integer part frequency offset according to the largest filtered preamble signal.

7. The method of claim 6 further comprising:
   generating a first sum of magnitudes of 3n channels of the preamble signal;
   generating a second sum of magnitudes of 3n+1 channels of the preamble signal;
   generating a third sum of magnitudes of 3n+2 channels of the preamble signal;
   determining a greatest sum of the first, second and third sums; and
   determining an integer part frequency offset set corresponding to the greatest sum;
   wherein a range of n is approximately one-third number of channels of the preamble signal; and
   wherein receiving the preamble signal is receiving a preamble signal offset by an integer part frequency offset of the integer part frequency offset set.

8. A method of performing cell search in a wireless communications system, the method comprising:

receiving a preamble signal;

match filtering the preamble signal with a plurality of pseudo noise sequences to form a plurality of filtered preamble signals;

summing the plurality of filtered preamble signals to form one of a plurality of summed preamble signals;

choosing a largest summed preamble signal from the plurality of summed preamble signals; and determining an estimated pseudo noise sequence index and an estimated integer part frequency offset according to the largest summed preamble signal;

match filtering the preamble signal with at least a first pseudo noise sequence and a second pseudo noise sequence corresponding to the estimated pseudo noise sequence index and the estimated integer part frequency offset to form a plurality of filtered preamble signals; and generating an estimated pseudo noise sequence from a largest filtered preamble signal of the plurality of filtered preamble signals.

9. The method of claim 8 further comprising:

generating a first sum of magnitudes of 3n channels of the preamble signal;

generating a second sum of magnitudes of 3n+1 channels of the preamble signal;

generating a third sum of magnitudes of 3n+2 channels of the preamble signal;

determining a greatest sum of the first, second and third sums; and determining an integer part frequency offset set corresponding to the greatest sum;

wherein a range of n is approximately one-third number of channels of the preamble signal; and wherein receiving the preamble signal is receiving a preamble signal offset by an integer part frequency offset of the integer part frequency offset set.

10. The method of claim 9, wherein match filtering the preamble signal with the plurality of pseudo noise sequences to form the plurality of filtered preamble signals comprises:

match filtering the preamble signal with each pseudo noise sequence of the plurality of pseudo noise sequences at a plurality of delay values to form corresponding pluralities of replicas; and combining each plurality of replicas to form corresponding filtered preamble signals of the plurality of filtered preamble signals.

11. A method for generating an integer part frequency offset set comprising:

generating a first sum of magnitudes of sub-carriers whose index is a multiple of 3 of the preamble signal;

generating a second sum of magnitudes of sub-carriers whose index is a multiple of 3 offset by 1 of the preamble signal;

generating a third sum of magnitudes of sub-carriers whose index is a multiple of 3 offset by 2 of the preamble signal;

determining a greatest sum of the first, second and third sums; and determining the integer part frequency offset set corresponding to the greatest sum;

wherein a range of n is approximately one-third number of sub-carriers of the preamble signal.

* * * * *